US011874681B2

(12) United States Patent
Nemenman et al.

(10) Patent No.: US 11,874,681 B2
(45) Date of Patent: Jan. 16, 2024

(54) MATCHER FOR MULTI MODULE SOLAR STRING POWER GENERATION SYSTEMS AND A METHOD THEREOF

(71) Applicant: SOLAD—SOLAR ELECTRONICS LTD., Jerusalem (IL)

(72) Inventors: Ilya Nemenman, Modi'in Makabim-Re'ut (IL); Shlomo Adler, Jerusalem (IL); Evsei Berman, Netanya (IL)

(73) Assignee: SOLAD—SOLAR ELECTRONICS LTD., Jerusalem (IL)

( * ) Notice: Subject to any disclaimer, the term of this patent is extended or adjusted under 35 U.S.C. 154(b) by 366 days.

(21) Appl. No.: 17/295,188

(22) PCT Filed: Nov. 11, 2019

(86) PCT No.: PCT/IL2019/051231
§ 371 (c)(1),
(2) Date: May 19, 2021

(87) PCT Pub. No.: WO2020/105030
PCT Pub. Date: May 28, 2020

(65) Prior Publication Data
US 2022/0011802 A1 Jan. 13, 2022

(30) Foreign Application Priority Data

Nov. 25, 2018 (IL) .......................................... 263277

(51) Int. Cl.
*G05F 1/67* (2006.01)
*H02S 40/32* (2014.01)
(Continued)

(52) U.S. Cl.
CPC ................ *G05F 1/67* (2013.01); *H02J 3/381* (2013.01); *H02S 40/32* (2014.12); *H02S 40/36* (2014.12); *H02J 2300/26* (2020.01)

(58) Field of Classification Search
CPC ... G05F 1/66; G05F 1/67; H02S 40/00; H02S 40/30; H02S 40/32; H02S 40/34; H02S 40/36; H02S 40/38; H02J 2300/36
See application file for complete search history.

(56) References Cited

U.S. PATENT DOCUMENTS 9,106,105 B2 *  8/2015  McCaslin ................ H02J 3/46
10,110,000 B2 * 10/2018  Rozman .................... H02J 7/35
(Continued)

FOREIGN PATENT DOCUMENTS

| CN | 105827180 A | 8/2016 |
| EP | 2621047 A2 | 7/2013 |
| GB | 2513868 A | 11/2014 |

OTHER PUBLICATIONS

International Search Report for PCT/IL2019/051231 dated Feb. 27, 2020.

*Primary Examiner* — Jeffrey A Gblende
(74) *Attorney, Agent, or Firm* — Millen, White, Zelano & Branigan P.C.; William F. Nixon

(57) ABSTRACT

The present invention relates to an apparatus for maximizing the power of a multi module solar string power generation system, comprising an Injection Circuit (IC), connected to a DC bus and to a string of solar panels, wherein the IC is also connected to at least one separated solar panel of the string. The IC regulates the power production of the connected string and utilizes the excess power to the solar inverter. The IC comprises: (i) a first MPPT mechanism, for finding the MPP of the string; (ii) a second MPPT mechanism, for finding the MPP of the separated panel; (iii) a first DC/DC converter, for converting some of the power, from the (Continued)

separated panel, to regulating power for the connected string; and (iv) a second DC/DC converter, for converting and utilizing, the excess power from the separated panel, to the solar inverter using the DC bus.

6 Claims, 10 Drawing Sheets

(51) Int. Cl.
*H02S 40/36* (2014.01)
*H02J 3/38* (2006.01)

(56) References Cited

U.S. PATENT DOCUMENTS

| | | |
|---|---|---|
| 2008/0150366 A1 | 6/2008 | Adest et al. |
| 2009/0218887 A1 | 9/2009 | Ledenev et al. |
| 2009/0284240 A1 | 11/2009 | Zhang et al. |
| 2012/0319489 A1* | 12/2012 | McCaslin ............ H02J 3/381 |
| | | 307/77 |
| 2013/0026839 A1 | 1/2013 | Grana |
| 2014/0333135 A1 | 11/2014 | Hargis et al. |
| 2015/0364918 A1 | 12/2015 | Singh et al. |
| 2016/0254672 A1 | 9/2016 | Yoscovich et al. |
| 2016/0268809 A1 | 9/2016 | Ledenev et al. |
| 2016/0285272 A1 | 9/2016 | Arditi et al. |

\* cited by examiner

MATCHER FOR MULTI MODULE SOLAR STRING POWER GENERATION SYSTEMS AND A METHOD THEREOF

TECHNICAL FIELD

The present invention relates to solar power generation systems. More particularly, the present invention relates to a method and apparatus for maximizing the power produced from multi module solar string power generation systems.

BACKGROUND

As of today, Photovoltaic solar power generation systems, i.e. solar farms, are typically made up of solar panels comprising photovoltaic "cells". Photovoltaic cells are semiconductor devices that convert light into energy. When light shines on a panel, a voltage develops across the panel, and when connected to a load, current flows. The voltage and current vary with several factors, including the physical size of the panel, the panel efficiency, the amount of light shining on the panel, the temperature of the panel, and other factors.

Typically, a number of solar panels are connected in series, referred to as a "string", to create an increased output voltage. As a general rule, the higher the voltage—the less the energy loss, hence the higher the efficiency of the system. Thus, it is desirable to connect as much panels in series as possible in a string. However, the permitted maximum output voltage, of a single string, is typically limited by standards and state rules, due to the hazardous nature of a very high voltage. Thus, to generate substantial power at a minimum loss, photovoltaic power generation systems are typically comprised of many "high voltage" strings connected in parallel. These parallel-connected strings are referred to as "arrays".

Since the Solar cells generate DC power, while the electricity grid is typically AC power, an "inverter" has to be connected. An inverter may be connected to an array of many parallel-connected strings, for converting their DC power to AC power, for feeding the electricity grid or local consumers.

Many solar inverters contain Maximum Power Point Tracking (MPPT) circuitry for maximizing the power from the strings. These known-in-the-art MPPT circuits adjust the voltage (and the current) at which the arrays operate, measure their output power, and seek those voltage and current values at which power output is maximized. Thus, the MPPT of the array is typically done by the inverter.

Arrays generate their maximum power when all the strings, comprising the array, operate at the same maximum power point. However, aging or other deficiencies may cause some of the cells in the strings to malfunction. Since an impaired panel may have an austere impact on the efficiency of the whole array there is a need to replace the impaired panel. However, finding a solar panel having the same initial properties of the impaired panel is difficult and sometimes impossible, this is due, inter alia, to the fact that typically, the newer panels are more efficient. In recent years, the efficiency of the solar panels has been enhanced by an average of 3% per year.

When a fraction of the panels in a series string is replaced, the newer panels typically generate more power than the other, older panels. However, the current of each string is dictated by the weakest panel in the string, and thus the robust voltage, of the new panels, may interfere with the balance of the other panels in the string. In addition, the overflow power, from the newer panels may cause the heating of the rest of the panels which may reflect in the decline of power production and may also speedup the deterioration of these solar panels. In this situation, the performance, of the array, is lost in three ways, the first of which is simply that the excess power from the new panels is not utilized, the second is that the excess power is typically turned into heat which may ruin the attached panels, over time, and the third is that the excess power may disturb the balance of the array.

It is therefore desired to introduce cost-effective means to utilize the full power production from the newer panels of the array, by ensuring that excess power is bypassed around the weaker panels and fed directly into the inverter.

One approach to solve this problem is to equip each panel in a string with an optimizer that regulates the panel voltage as needed. This approach is expensive because an optimizer is needed for each panel in the array.

U.S. Pat. No. 7,605,498 discloses a high efficiency photovoltaic DC-DC converter which achieves solar power conversion from high voltage, highly varying photovoltaic power sources. Voltage conversion circuits are described which have pairs of photovoltaic power interrupt switch elements and pairs of photovoltaic power shunt switch elements to first increase voltage and then decrease voltage as part of the desired photovoltaic DC-DC power conversion. Thus, the Photovoltaic DC-DC converters can achieve efficiencies in conversion that are high compared to traditional through substantially power isomorphic photovoltaic DC-DC power conversion capabilities. However, this approach has disadvantages as it requires an implementation for each panel.

It would therefore be desired to propose a system void of these deficiencies.

SUMMARY

It is an object of the present invention to provide a method for maximizing the power from multi module solar string power generation systems, that comprise panels with different power productions It is another object of the present invention to provide an apparatus for utilizing excess voltage and current, from newer solar panels that are connected in a string with older panels, while maximizing the power from the whole string and without reducing the power production of the weaker panels and without reducing their life span.

It is still another object of the present invention to provide a method for maximizing the power from a string that comprises solar panels with different energy productions, while accommodating non-flexible inverters such as: central inverters, single MPPT inverters or multiple MPPT with multiple Strings inverters.

It is still another object of the present invention to provide a method for using together, in the same string, different solar panels using different technologies such as: mono, poly or thin-film, that is energy efficient and cost effective.

Other objects and advantages of the invention will become apparent as the description proceeds.

The present invention relates to an apparatus for maximizing the power of a multi module solar string power generation system, comprising: (a) at least one string of solar panels where at least one solar panel, of said string, is separated from the other panels in said string; (b) a DC bus, connected to said string; (c) a solar inverter, connected, at its input, to said DC bus, for converting the solar DC power, from said at least one string, to AC power; and (d) an Injection Circuit (IC), connected to said DC bus and to said string, wherein said IC is also connected to said at least one separated solar panel, and wherein said IC regulates the power production of said connected string and utilizes the excess power from said at least one separated panel to said solar inverter using said DC bus, comprising: (i) a first MPPT mechanism, for finding the MPP of at least part of said string; (ii) a second MPPT mechanism, for finding the MPP of said at least one separated panel, connected to said IC; (iii) a first DC/DC converter, for regulating the power of said connected string by converting some of the power, from said at least one separated panel, to regulating power for said connected string; and (iv) a second DC/DC converter, for converting and utilizing, the excess power from said at least one separated panel, to said solar inverter using said DC bus.

In one embodiment, the string comprises panels with different power capabilities, wherein part of the panels have a higher power capability than the other panels of the string.

Preferably, the IC comprises a third MPPT mechanism, for finding the MPP of the higher power panels of the string.

Preferably, the IC comprises a third DC/DC converter, for utilizing excess power, from the panels which have a higher power capability, to said DC bus.

The present invention also relates to a method for maximizing the power of a multi module solar string power generation system, comprising: (a) providing at least one string of solar panels; (b) separating at least one solar panel, of said string, from the other panels in said string; (c) providing a DC bus, connected to said string; (d) providing a solar inverter, connected, at its input, to said DC bus, for converting the solar DC power, from said at least one string, to AC power; and (e) providing an IC, connected to said DC bus and to said string, wherein said IC is also connected to said at least one separated solar panel; (f) regulating the power of said string by converting some of the power, from said at least one separated panel; and (g) utilizing the excess power from said at least one separated panel to said solar inverter using said DC bus.

BRIEF DESCRIPTION OF THE DRAWINGS

The accompanying drawings, and specific references to their details, are herein used, by way of example only, to illustratively describe some of the embodiments of the invention.

In the drawings.

DETAILED DESCRIPTION

Photovoltaic solar power generation systems generate their maximum power when all the strings, comprising the array, operate at the same Maximum Power Point (MPP). However, when a fraction of the panels, in a string, are replaced with newer panels, the newer panels typically generate more power, i.e. more voltage and current, than the other older panels. However, the current of each string is dictated by the weakest panel in the string, and thus the robust power, of the newer panels, may be at large unutilized and lost. In addition, the overflow of excess power, from the newer panels, may interfere with the power balance of the other strings in the array, not to mention the heat from the excess power, which will decrease their power production and may speed up the deterioration of the connected panels. The term "multi module solar string" is meant to include hereinafter, any string, of solar panels, which has panels with different power production such as: a string with newer and older panels or a string having panels that may be shaded randomly or regularly, etc.

Figure 1:
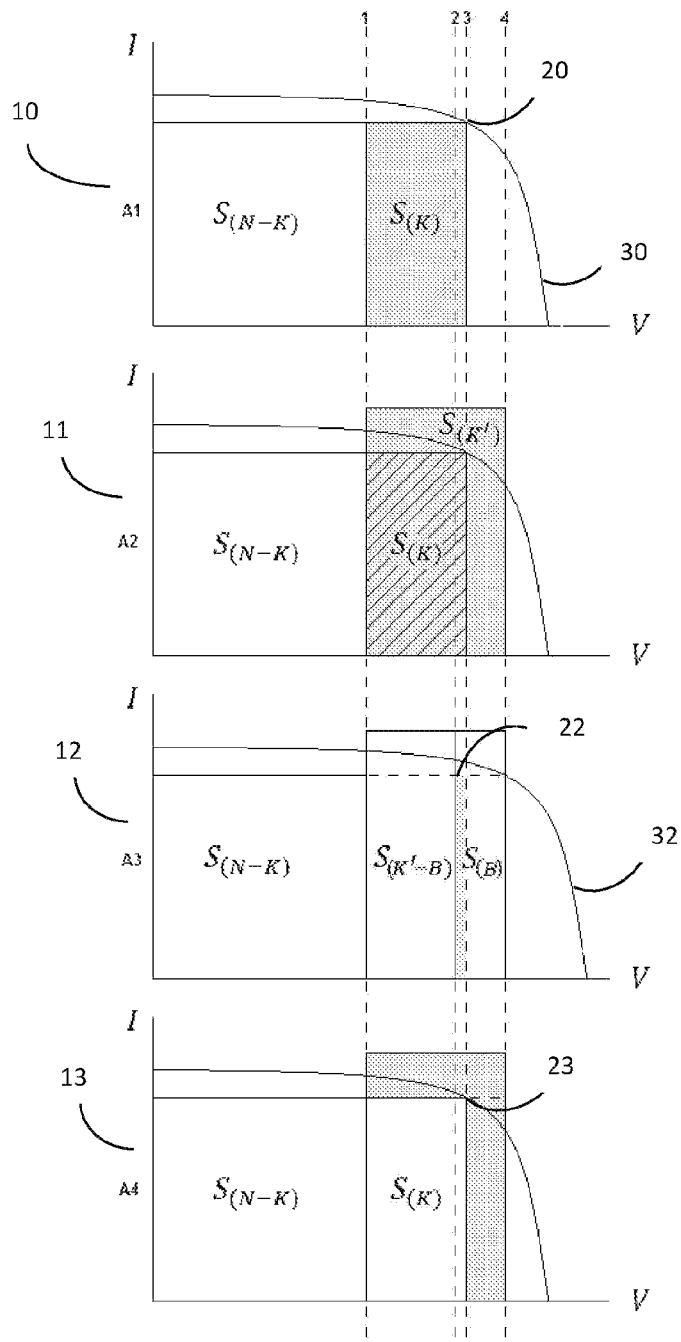
FIG. 1 is a diagram of graphs which exhibit the electrical Power production performances of solar panels strings based on their I-V curve, according to an embodiment.

FIG. 1 is a diagram of 4 graphs which exhibit the electrical Power production performances of solar panels strings based on their I-V curve, i.e. current and voltage characteristics, according to an embodiment. When a number of solar panels are connected in series, i.e. a string, their combined energy output typically acts as curve 30 in graph 10. When working in a voltage mode circuit, the consumed current, from the string, is fairly stable when the consumed voltage is raised until a certain point, after which the current drops rapidly when the voltage is raised, as shown by curve 30. Since the Power of the string equals to the current times voltage ($P=I*V$), the Maximum Power Point (MPP) of the string, on curve 30, is located at MPP 20. As shown, in graph 10, the maximum area of the rectangle, that is limited by the curve 30, is defined by the point 20 (X, Y) grid. When some of the panels in a string need to be replaced, with newer panels, the current and voltage characteristics of the newer panels may be different from the older panels. For example, the area that symbolizes the power that is generated by the older panels, that are intended for replacement, is painted in gray and symbolized by S(k). The area that symbolizes the power that is generated by the older panels that are not intended for replacement, is symbolized by S(n-k).

Graph 11, in FIG. 1, visually depicts the power production of the string once some of the older panels have been replaced by newer panels. For example, the area that symbolizes the power that is produced by the newer panels, is painted in gray and is symbolized by S(k'), whereas the area that symbolizes the power that would have been generated by the older panels, is marked in slanted lines and symbolized by S(k). As shown in graph 11 the voltage and current of the newer panels are both higher than the voltage and current of the older panels. If left alone, the Maximum Power Point Tracking (MPPT) of the inverter would try to enhance the voltage of the string in order to maximize the power from the string as shown by curve 32 in graph 12. However, if the inverter is connected to a number of strings, the change of voltage may change the power level of the other strings which eventually will drag the MPPT of the inverter to some kind of an average voltage point between the strings, which is not the maximum power point for any of the strings, effectively unbalancing the power production of the whole array and wasting power.

In one embodiment, a solution is proposed which utilizes the excess voltage and current from the newer panels and feeds them to the inverter. Furthermore, this solution maintains the initial MPPT point of the string, and maintains the balanced average MPPT of the array. For example, the area that symbolizes the excess power produced by the newer panels, is painted in gray in graph 13. Once the excess voltage and current, of the newer panels, are properly utilized and fed to the inverter, from outside the string, the MPP 23 of the string, as depicted in graph 13, may be equal to the desired initial balanced MPP 20 which typically corresponds to the MPP of the other strings.

Figure 2:
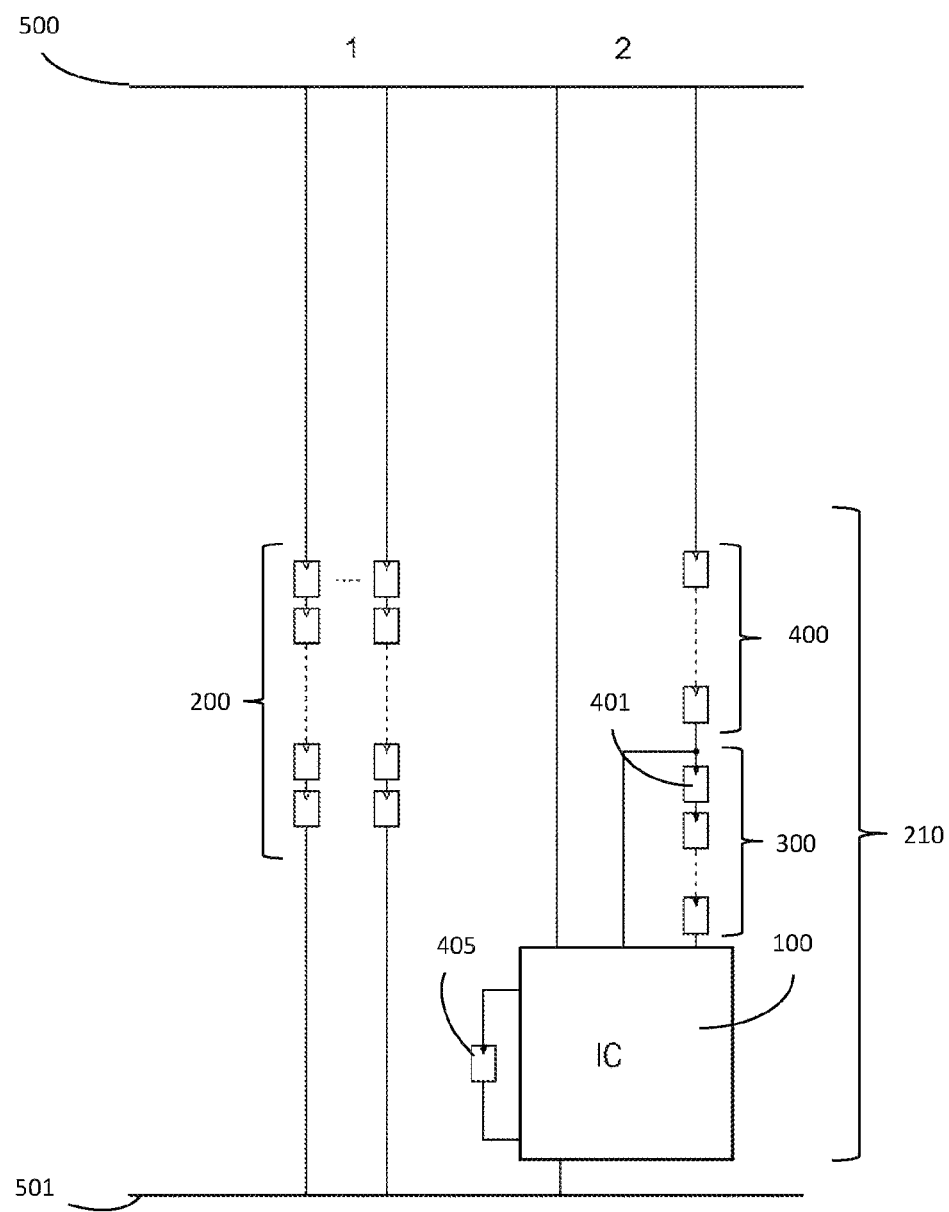
FIG. 2 is a schematic diagram depicting strings of solar panels connected in an array, with an Injection Circuit (IC), according to an example.

FIG. 2 is a schematic diagram depicting a matcher for maximizing the power of a multi module solar string, with an injection circuit, according to an example. For the sake of brevity, an inverter has not been shown in FIG. 2, however, the proposed system also includes a solar inverter, connected, at its input, to the DC bus 500-501, for converting the solar DC power, from the strings, to AC power. The purpose of the Injection Circuit (IC) is to regulate the power production of its connected string, and to utilize the excess power, from the newer panels, to the inverter, without disrupting the initial balanced MPP of the string. In this example the array may have a number of strings such as string 200, which is a typical string of older solar panels, connected in series between bus lines 500-501. In this example, substring 400 is a part of an old string, where substring 400 comprises a number of older panels in working order. Some of the older panels that used to be connected in series to substring 400 have been replaced by newer panels such as the newer panel 401 or newer panel 405. For the sake of brevity, the newer panels have been marked by a black triangle in the drawing. In this example, the 2 substrings, 300 and 400, and the newer panel 405 form together the multi module solar string 210. At first, the newer panels may be divided according to the following equation:

$$B \geq \left\lceil \frac{V_{mp\_new(K')} - V_{mp\_old(K)}}{V_{mp\_new}} \right\rceil$$

where:
V mp_new(K') is the total voltage of the newer panels
V mp_old(K) was the total voltage of the replaced panels
V mp_new is the voltage of a single newer panel
$\lceil \ldots \rceil$ is the ceiling, i.e. the smallest natural number greater than the sum in the equation.

Thus, the B represents the number of newer panels that are separated from the rest of the newer panels in the string. In this example, in FIG. 2, B is equal to 1, therefore, only 1 panel, panel 405, is separated from the rest of the newer panels in the string. Thus, at this stage, after separation, the voltage produced from the non-separated newer panels is less than the initial voltage produced by the older panels that have been replaced. In one embodiment, these non-separated panels, panels of substring 300, may be connected in series to the older panels of substring 400, together with the IC 100, as depicted in FIG. 2. In this example both substrings, 300 and 400, together produce a voltage, at their MPPT, which is less than the voltage of the other strings in the array at their initial MPP, such as string 200. At this stage the IC 100 may add voltage, taken from the separated panel 405, to the string in order to match the voltage, of the entire string 210, to that of the other strings at their MPP, e.g. the voltage of string 200, for balancing the array.

Returning to FIG. 1, the power from the non-separated panels is marked by S(k'−b) in graph 12, whereas the power from the separated panels is marked by S(b). As shown in graph 12, the MPP of both strings, the old panels string and the non-separated newer strings, i.e. S(n−k)+S(k'−b), is at point 22 which is a little lower, in voltage, than the initial point 20. In this example the required power needed to match the power of the other strings is marked in gray. At this stage the IC may add the power to the string to achieve the required MPP 23, as depicted in graph 13, and which corresponds to the required balanced MPP 20 of graph 10. In one embodiment, the IC may add the power, which consists a current equal to the current of substring 400 and voltage equal to the voltage needed to reach the desired MPP 23, thus the IC can regulate the power production of said connected string 210 to match the power of the other strings in the array.

In one embodiment, the IC may have a first MPPT mechanism, for finding the MPP of the substring 400, as described in relations to FIG. 2. The IC can then change its inner voltage for finding the correct voltage required for adding, in order to regulate the power production of said connected string 400 to maximize and match the voltage of string 200. For example, since the voltage between the DC bus lines 500-501 is considered stable, the IC 100 can lift its inner voltage and see if the power of the substring 400 rises or falls, alternatively the IC 100 can lower its inner voltage and measure the power of the substring 400. Thus, the IC 100 can fine tune its inner voltage to maximize the power from the substring 400.

Figure 3:
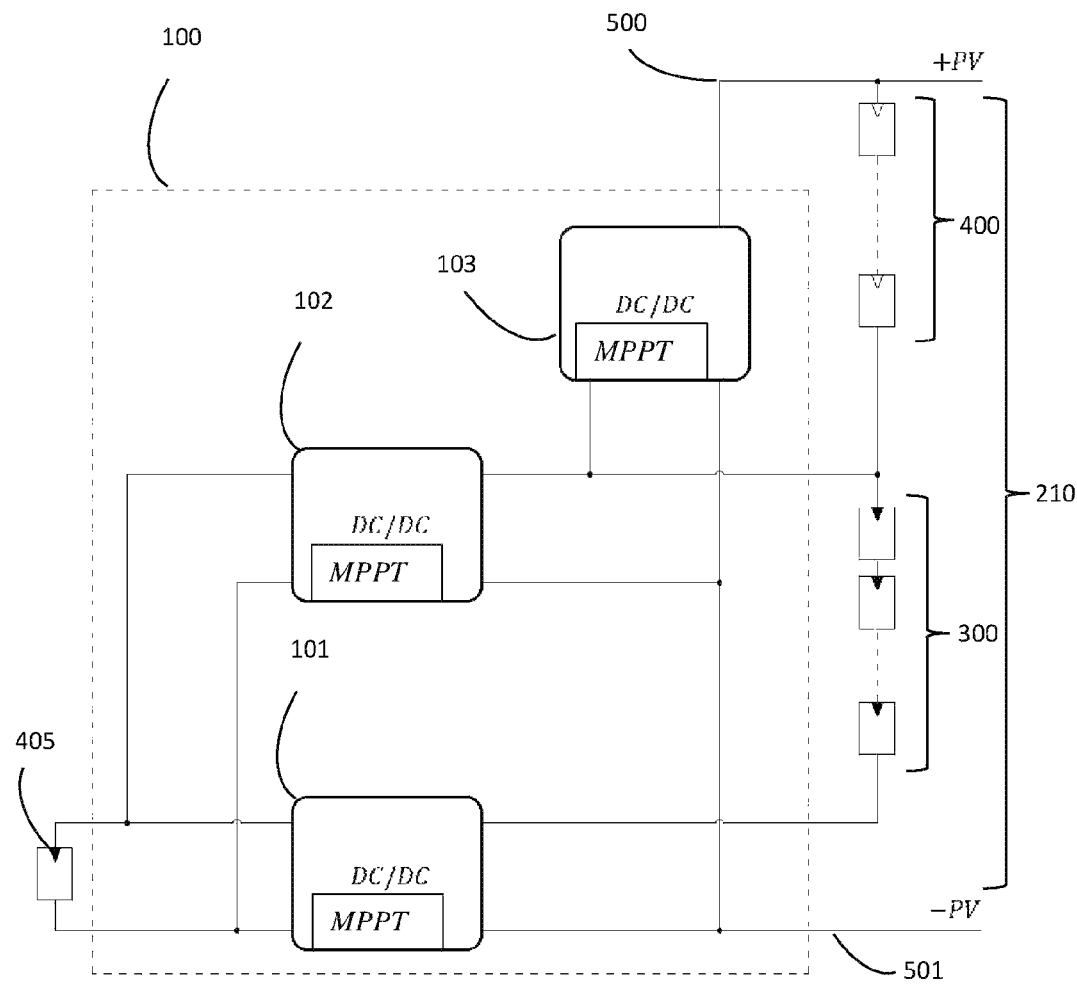
FIG. 3 is a schematic diagram depicting some of the inner parts of the IC, according to an embodiment.

FIG. 3 is a schematic diagram depicting some of the inner parts of the IC, according to an embodiment. In this embodiment, the IC 100 may be connected to the DC bus 500-501 and to the string 210, which comprises substrings 300 and 400, and the panel 405. The IC 100 may also be connected, at its input, to the separated panel 405, or to more than one separated panel, as described above in relations to FIG. 2. The DC/DC 101 may comprise a first MPPT mechanism, for finding the MPP of substring 400. The DC/DC 102 may also comprise a second MPPT mechanism, for finding the MPP of the separated panel 405 and its optimized current and voltage. In some cases, the DC/DC 103 may also comprise a third MPPT mechanism, for finding the MPP of substring 300. As mentioned above, the current of the whole string 210 is typically determined by string 400, i.e. its weakest link. In order to regulate the voltage of the string 210, the IC 100 is required to supply the amount of voltage which is the difference between the combined voltages of substrings 300, 400 and the initial voltage of the string, before the replacement of the panels. Thus, when regulated, the voltage of the string 210 should correspond to the MPP voltage of the other corresponding strings in the array. The IC 100 may also have a first DC/DC converter 101, for converting part of the power from the panel 405 to the required voltage and current of the string 210.

In one embodiment the IC 100, of FIG. 3, can enhance/reduce its output voltage while measuring the power from the substring 400 until the substring 400 reaches its MPPT point. Thus, the first DC/DC converter 101 may be used for regulating the power of the connected string 210 by converting some of the power from the separated panel 405 into current and voltage for string 210. The IC 100 may also have a second DC/DC converter 102, which is connected at its input to the separated panels such as panel 405, and at its output to the bus 500-501 through DC/DC 103. The DC/DC converter 102 may be used for converting and utilizing the excess power from the separated panel 405, i.e. the power not used by converter 101 for regulating the power of string 210, to the connected DC bus 500-501. Thus, the IC 100 can regulate the power production of the connected string 210 and utilize the excess power from the separated panel 405 to the solar inverter (not shown) using the DC bus 500-501.

In one embodiment, the IC 100 may have a third DC/DC converter 103, which is connected at its input to the substring 300 and at its output to the bus 500-501. As described above, part of the power of the string 300 flows through the string 210, mainly a current which corresponds to the current of string 400 and a corresponding voltage, however, the excess power from the substring 300 may be drained out by the third DC/DC converter 103 and utilized to the solar inverter (not shown) using the DC bus 500-501. Thus, the DC/DC converter 103 may be used for converting part of the power from the substring 300, and the excess power of substring 405 from DC/DC 102 and utilizing this excess power to the bus 500-501, which leads the excess power to the solar inverter (not shown).

Figure 4:
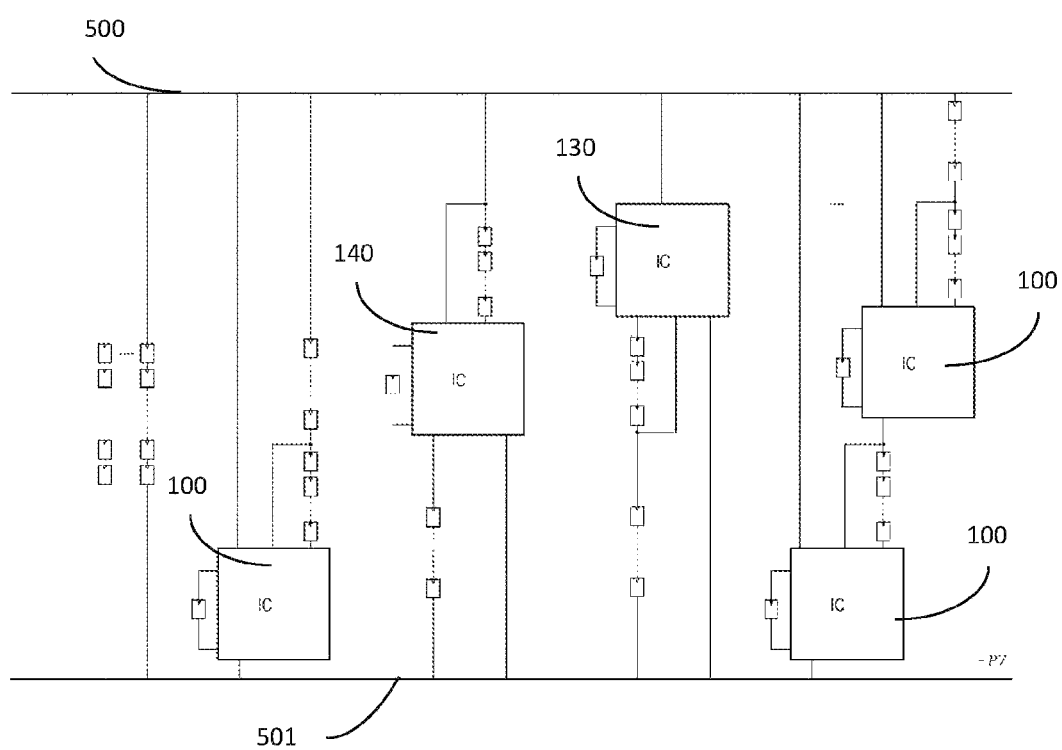
FIG. 4 is a schematic diagram depicting strings of solar panels connected in an array, with injection circuits, according to an example.

FIG. 4 is a schematic diagram depicting strings of solar panels connected in an array, with injection circuits, according to an example. In this example the ICs may be connected in series to the panels such as IC 100, 130, or the ICs may be connected in a cascade mater such as depicted. In other words, the excess power utilized by the ICs may be connected directly to the bus lines 500-501 or may be connected in a cascade mater to each other before connecting to the bus lines 500-501. The cascading may be done in more than one step where more than 2 ICs are cascaded one after another. In one embodiment the IC may be connected between the older and the newer strings such as depicted for IC 140. In other embodiments the IC may be connected in series to the older and newer strings and connected to the positive bus line 500, such as depicted for IC 130. Other embodiments are possible as well. In one embodiment the separated panels are connected directly to the IC where the IC uses some of the power from the separated Panels to regulate the power of the string. In some cases, this system may be used for dealing with the shading some of the panels.

Figure 5:
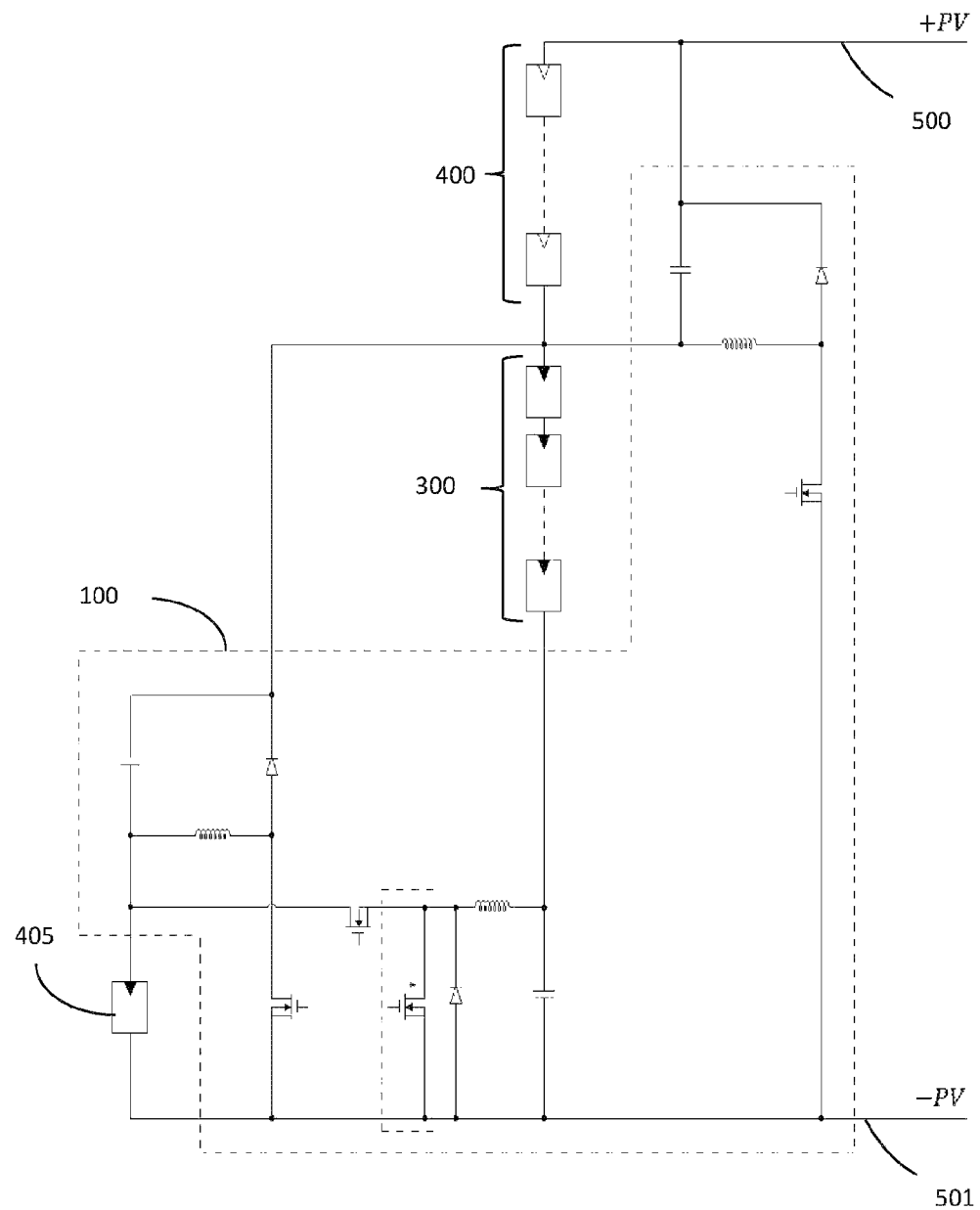
FIG. 5 is a schematic diagram of some of the inner parts of an exemplified IC, according to an embodiment.

FIG. 5 is a schematic diagram of some of the inner parts of an exemplified IC 100 that describe possible solution for FIG. 3, according to an embodiment. As known in the art, there can be many electrical implementations for the IC 100, nevertheless, for the sake of enablement, an IC, e.g. using modules boost and buck, is depicted as an embodiment of an IC 100.

Figure 6:
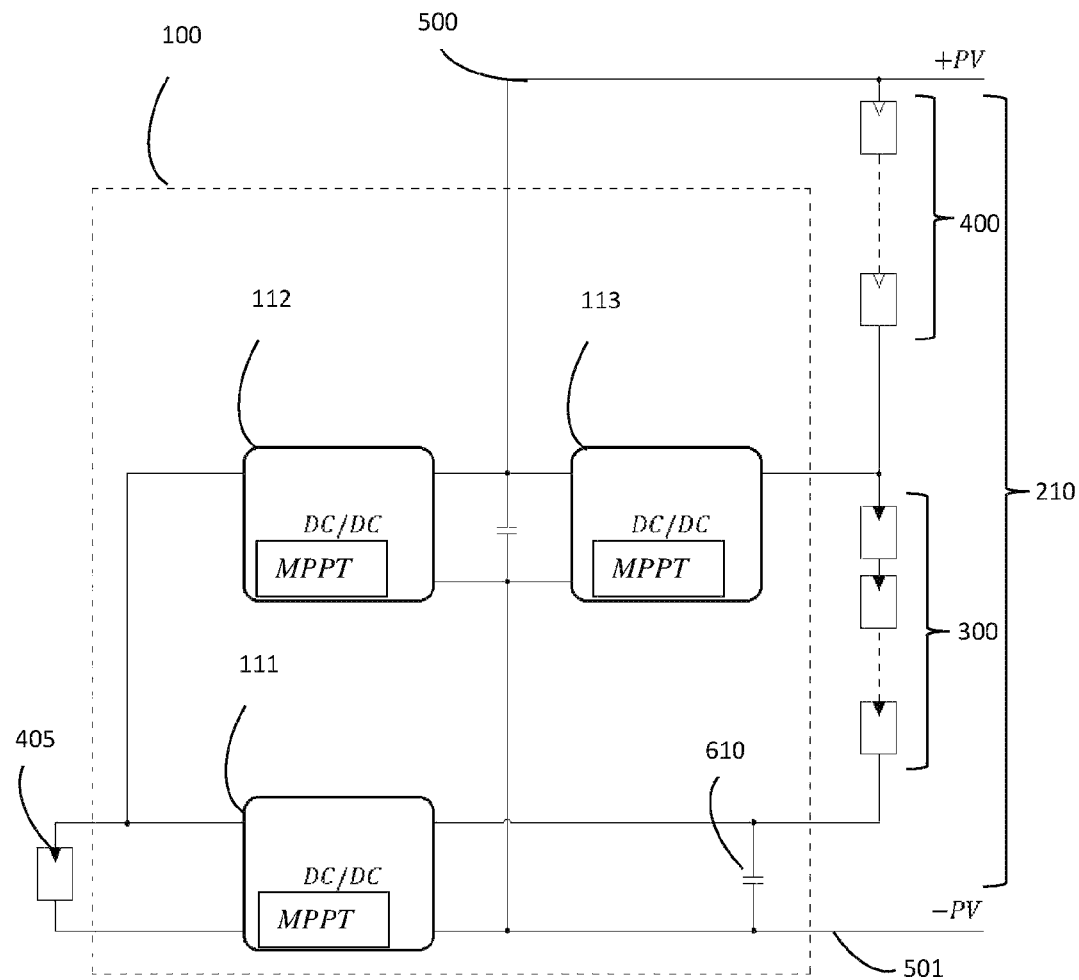
FIG. 6 is a schematic diagram depicting some of the inner parts of the IC, according to another embodiment.

FIG. 6 is a schematic diagram depicting some of the inner parts of the IC, according to another embodiment. In this embodiment, the IC 100 may be connected to the DC bus 500-501 and to the string 210, which comprises substrings 300 and 400, and the panel 405. The IC 100 may also be connected, at its input, to the separated panel 405, or to more than one separated panel, as described above in relations to FIG. 3. The IC 100 may comprise a first MPPT mechanism, for finding the MPP of substring 400. The IC 100 may also comprise a second MPPT mechanism, for finding the MPP of the separated panel 405 and its optimized current and voltage. In some cases, the IC 100 may also comprise a third MPPT mechanism, for finding the MPP of substring 300. In this embodiment the IC 100, of FIG. 6, can adjust the voltage on the capacitor 610, by draining power from the separated panel 405 to the capacitor 610. The IC 100 can enhance/reduce the voltage on capacitor 610 while measuring the power from the string 400 until the string 400 reaches its MPPT point. Thus, the first DC/DC converter 111 may be used for regulating the power of the connected string 210 by converting some of the power from the separated panel 405 into power on the capacitor 610. The IC 100 may also have a second DC/DC converter 112, which is connected at its input to the separated panels such as panel 405, and at its output to the bus 500-501. The DC/DC converter 112 may be used for converting and utilizing the excess power from the separated panel 405, i.e. the power left after regulating the power of string 210, to the connected DC bus 500-501.

In one embodiment, the IC 100, of FIG. 6, may have a third DC/DC converter 113, which is connected at its input to the substring 300 and at its output to the bus 500-501. As described above, part of the power of the string 300 flows through the string 210, mainly a current which corresponds to the current of string 400 and a corresponding voltage, however, the excess power from the substring 300 may be drained out by the third DC/DC converter 113 and utilized to the solar inverter (not shown) using the DC bus 500-501.

Figure 7:
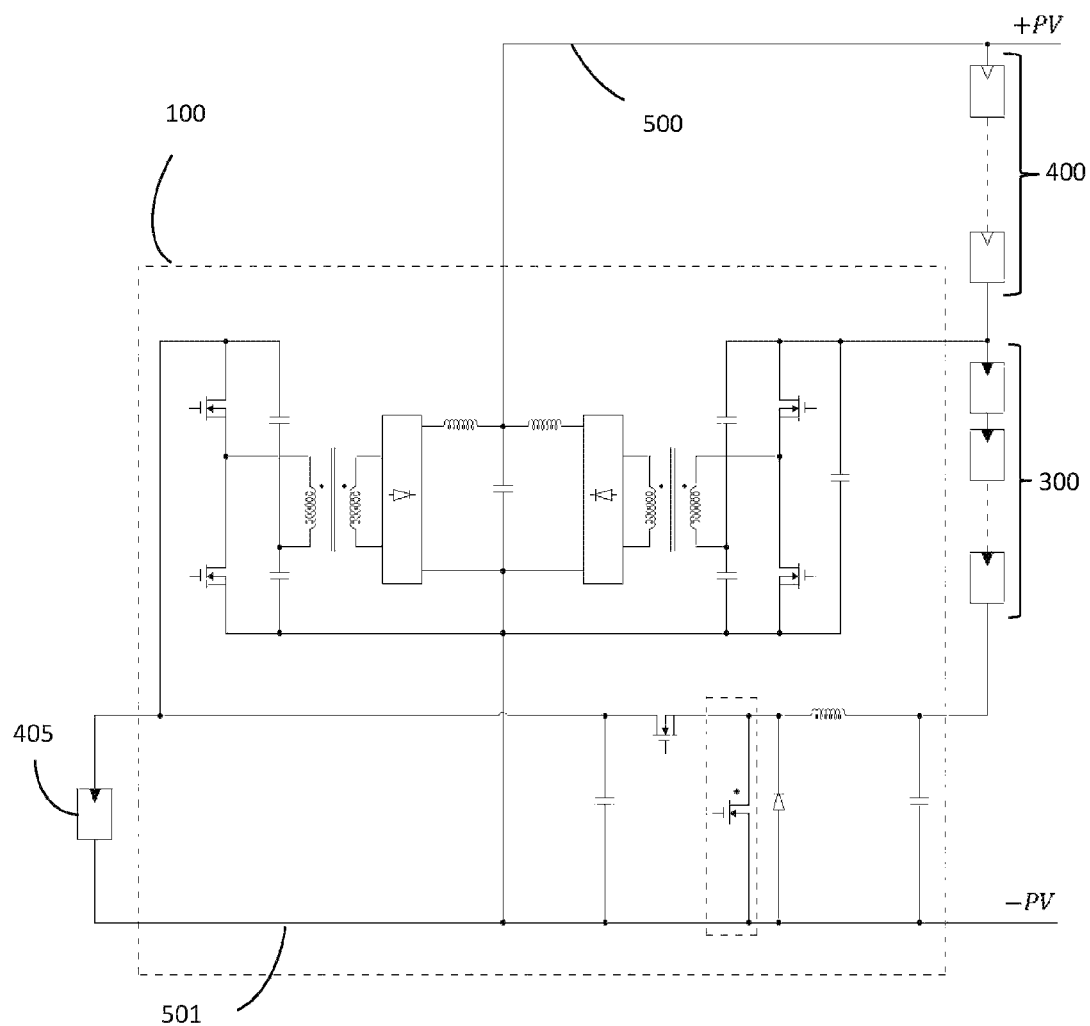
FIG. 7 is a schematic diagram of some of the inner parts of an exemplified IC, according to an embodiment.

FIG. 7 is a schematic diagram of some of the inner parts of an exemplified IC 100 that describe possible solution for FIG. 6, according to an embodiment. As known in the art, there can be many electrical implementations for the IC 100, nevertheless, for the sake of enablement, an IC, is depicted as an embodiment of an IC 100.

Figure 8:
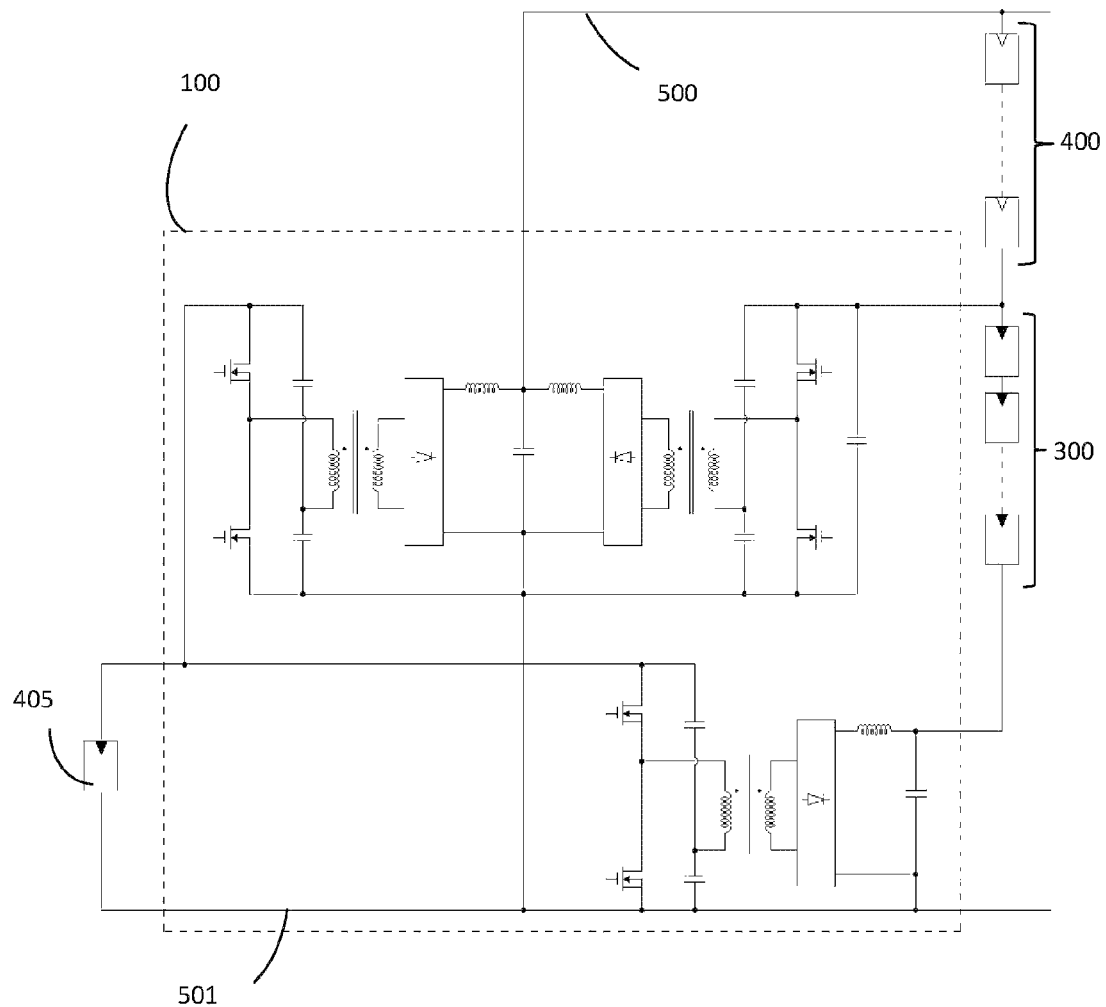
FIG. 8 is a schematic diagram of some of the inner parts of an exemplified IC, according to yet another embodiment.

FIG. 8 is a schematic diagram of some of the inner parts of an exemplified IC 100 that describe possible solution for FIG. 6, according to an embodiment. As known in the art, there can be many electrical implementations for the IC 100, nevertheless, for the sake of enablement, an IC, is depicted as an embodiment of an IC 100.

Figure 9:
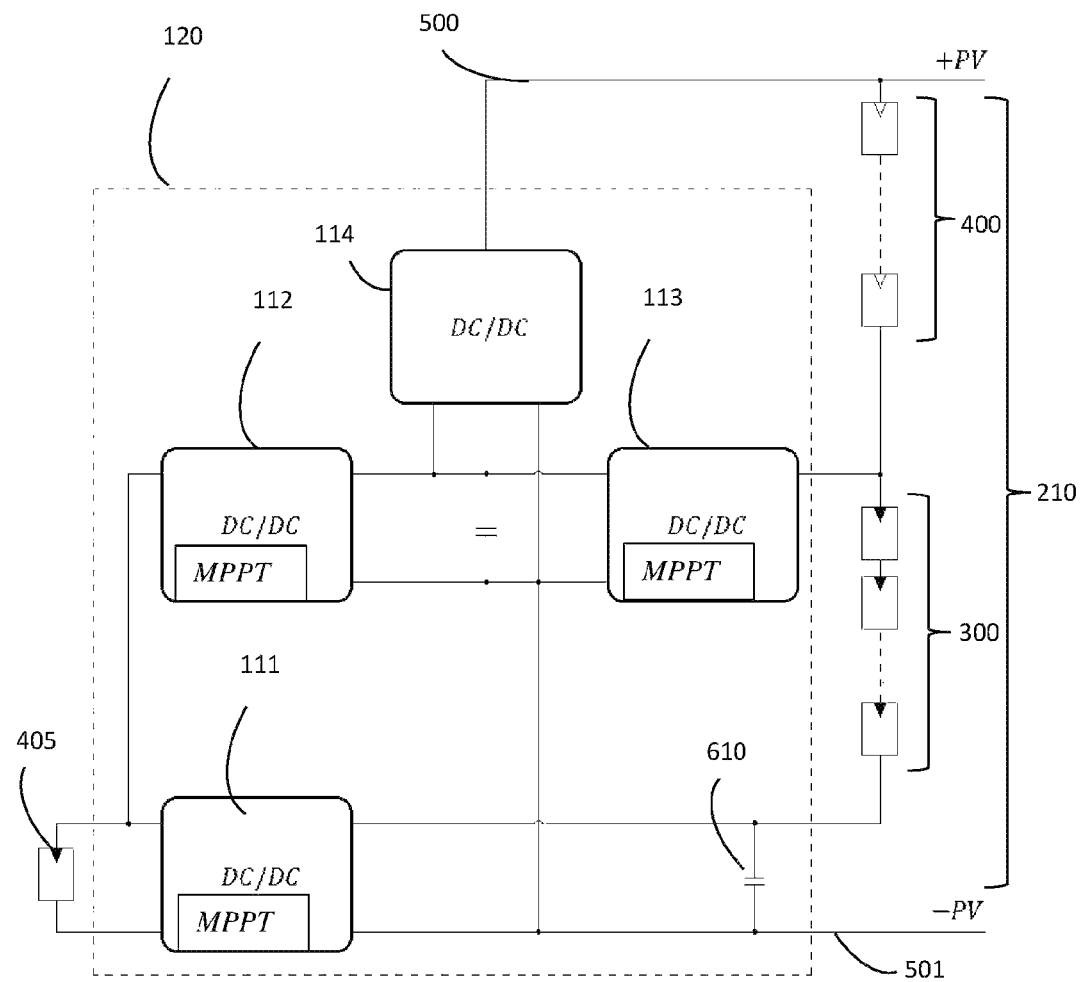
FIG. 9 is a schematic diagram depicting some of the inner parts of the IC, according to yet another embodiment.

FIG. 9 is a schematic diagram depicting some of the inner parts of the IC, according to yet another embodiment. In this embodiment, the IC 120 is similar to the IC 100 described in relations to FIG. 6, however, in this embodiment the IC 120 may have another DC/DC converter 114. Since the DC/DC convertors 112-113 may have to cope with a very high voltage variant at their input and a high voltage variant at their output, another DC/DC converter 114 may be added. Thus, the DC/DC converters 112-113 may be designed to cope with a high variant at their input, however, their output may be designed to be set and known. The set and known output voltage of DC/DC converters 112-113 is also the input voltage of inverter 114. Thus inverter 114 only needs to cope with the output variant, where its input is set and known.

This embodiment, may simplify the implementation of the design and increase the total efficiency of the IC 120, in comparison to IC 100.

Figure 10:
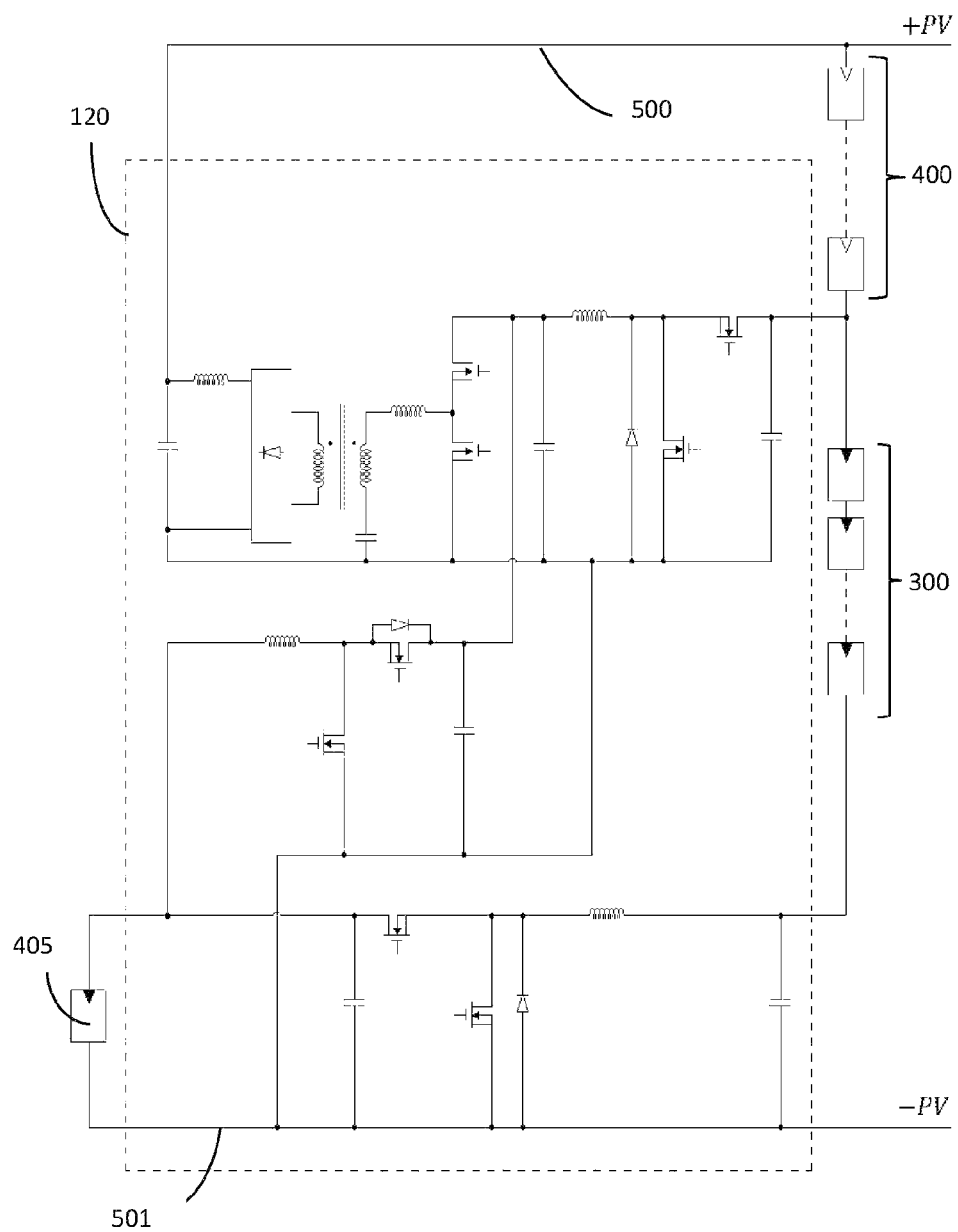
FIG. 10 is a schematic diagram of some of the inner parts of another exemplified IC, according to an embodiment.

FIG. 10 is a schematic diagram of some of the inner parts of an exemplified IC 120 that describe possible solution for FIG. 9, according to an embodiment. As known in the art, there can be many electrical implementations for the IC 120, nevertheless, for the sake of enablement, an IC, is depicted as an embodiment of an IC 120.

In some of the cases the proposed ICs may be used for solar farms having panels that may be shaded regularly. In some of the cases the shading may be frequent and known, for example, when the solar farm is installed on a roof that has a chimney. The panels that may be shaded by the chimney may be categorized as the "older" panels where the panels that are not shaded by the chimney may be categorized as the "newer" panels. Thus, an IC may be connected to these panels, on the roof, according to the described above. In this case at least one IC should be connected to each string. When the shade hits the panels, the IC can utilize the excess power from the unshaded panels and thus increase the total efficiency of the solar farm. In some embodiments, a number of ICs may be connected and cascaded in case other shade obstacles are present.

In some of the cases the proposed ICs may be used for solar farms having panels that may be shaded randomly. In some of the cases the shading may be random, for example, a cloud that drifts over the solar farm. The ICs may be connected to the strings of the solar farm where each string is connected to an IC. As described above, for each string, at least one panel is separated and its output is connected to the input of the IC, where the rest of the panels may be connected in parallel to the IC, as described in relations to FIG. 3. In this case the IC may be designed to frequently utilize some of the power of the separated panel to the inverter. Thus, when a shade hits a panel or more, the connected IC can compensate the loss of voltage of the string, from the shaded panel, and compensate the loss by increasing the voltage of string instead of utilizing the excess power to the inverter.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. An apparatus for maximizing a power of a multi module solar string power generation system, comprising:
    at least one multi module solar string which comprises solar panels having different power productions;
    a DC bus, connected to said string;
    a solar inverter, connected to said DC bus, for converting a solar DC power, from said at least one string, to AC power; and
    an Injection Circuit (IC), connected to said DC bus and to said string, wherein said IC is also connected to at least one solar panel, of said string, and wherein said IC regulates a power production of said connected string and utilizes an excess power, left after regulating the power of said string, from said at least one solar panel to said solar inverter using said DC bus, comprising:
        a first Maximum Power Point Tracking (MPPT) mechanism, for finding a Maximum Power Point (MPP) of at least part of said string;
        a second MPPT mechanism, for finding the MPP of said at least one solar panel, connected to said IC;
        a first DC/DC converter, for regulating a power of said connected string by converting some of a power, from said at least one solar panel, to regulating power for said connected string; and
        a second DC/DC converter, for converting and utilizing, the excess power, left after regulating the power of said string, from said at least one solar panel, to said solar inverter using said DC bus.

2. An apparatus according to claim 1, where part of the panels of the string have a higher power capability than the other panels of the string.

3. An apparatus according to claim 2, where the IC comprises a third MPPT mechanism, for finding an MPP of a higher power panels of the string.

4. An apparatus according to claim 2, where the IC comprises a third DC/DC converter, for utilizing the overflow of excess power, from the newer panels which have a higher power capability, to said DC bus.

5. A method for maximizing a power of a multi module solar string power generation system, comprising:
    providing at least one multi module solar string having solar panels with different power productions;
    providing a DC bus, connected to said string;
    providing a solar inverter connected to said DC bus, for converting a solar DC power, from said at least one string, to AC power; and
    providing an Injection Circuit (IC), connected to said DC bus and to said string, wherein said IC is also connected to at least one solar panel;
    regulating power of said string by converting some power, from said at least one solar panel; and
    utilizing an excess power, left after regulating the power of said string, from said at least one solar panel to said solar inverter using said DC bus.

6. A method according to claim 5, where part of the panels of the string have a higher power capability than the other panels of the string.

* * * * *